(12) United States Patent
Shepard et al.

(10) Patent No.: US 10,344,140 B2
(45) Date of Patent: Jul. 9, 2019

(54) PROCESS FOR PRODUCING NANO-SCALE CRYSTALLINE BOEHMITE

(71) Applicant: Pacific Industrial Development Corporation, Ann Arbor, MI (US)

(72) Inventors: David Shepard, South Lyon, MI (US); Nicholas Goodman, Ypsilanti, MI (US); Jeffery Lachapelle, Northville, MI (US); John Novak, Baton Rouge, LA (US); Wei Wu, Ann Arbor, MI (US)

(73) Assignee: Pacific Industrial Development Corporation, Ann Arbor, MI (US)

( * ) Notice: Subject to any disclaimer, the term of this patent is extended or adjusted under 35 U.S.C. 154(b) by 38 days.

(21) Appl. No.: 15/534,146

(22) PCT Filed: Dec. 10, 2015

(86) PCT No.: PCT/US2015/065011
§ 371 (c)(1),
(2) Date: Jun. 8, 2017

(87) PCT Pub. No.: WO2016/094665
PCT Pub. Date: Jun. 16, 2016

(65) Prior Publication Data
US 2018/0346685 A1    Dec. 6, 2018

Related U.S. Application Data

(60) Provisional application No. 62/090,596, filed on Dec. 11, 2014.

(51) Int. Cl.
*C08K 3/22* (2006.01)
*C08K 3/016* (2018.01)
*C01F 7/44* (2006.01)

(52) U.S. Cl.
CPC .............. *C08K 3/22* (2013.01); *C01F 7/447* (2013.01); *C01F 7/448* (2013.01); *C08K 3/016* (2018.01);
(Continued)

(58) Field of Classification Search
CPC ...................................... C01F 7/448
See application file for complete search history.

(56) References Cited

U.S. PATENT DOCUMENTS 5,445,807 A    8/1995  Pearson
6,143,816 A *  11/2000 Prescher ............. C01F 7/448
                                              423/625

(Continued)

FOREIGN PATENT DOCUMENTS

CN     102942199 A    2/2013
EP     1840085 A2    10/2007

(Continued)

OTHER PUBLICATIONS

European Patent Office, Rijswijk, Netherlands, International Search Report of International Application No. PCT/US2015/065011, dated Mar. 14, 2016, 3 pages.

*Primary Examiner* — Vu A Nguyen
(74) *Attorney, Agent, or Firm* — Brinks Gilson & Lione

(57) ABSTRACT

A crystalline Boehmite product and a method of forming said product is provided in which the crystalline Boehmite exhibits an average particle size (d50) that is less than 7,000 nanometers. This method comprises preparing an aqueous slurry by mixing together water, large aluminum oxide precursors, a highly dispersible Boehmite grade, and optionally, an organic dispersing agent; adjusting the pH of the slurry; heating the slurry for a predetermined duration of time; collecting the slurry to form a wet cake; and drying the wet cake to obtain the crystalline Boehmite product. The crystalline Boehmite product may be mixed with a plastic (Continued)

resin to form a flame retardant plastic mixture, which can be subjected to a conventional plastic processing method to form a flame retardant composite.

17 Claims, 6 Drawing Sheets

(52) U.S. Cl.
CPC ...... *C01P 2002/72* (2013.01); *C01P 2004/61* (2013.01); *C01P 2004/62* (2013.01); *C08K 2003/2227* (2013.01)

(56) References Cited

U.S. PATENT DOCUMENTS

| | | | |
|---|---|---|---|
| 2005/0124745 A1 | 6/2005 | Bauer et al. | |
| 2010/0324193 A1* | 12/2010 | Herbiet | C01F 7/02 524/437 |

FOREIGN PATENT DOCUMENTS

| | | |
|---|---|---|
| KR | 20140038727 A | 3/2014 |
| WO | 2009/103430 A2 | 8/2009 |

* cited by examiner

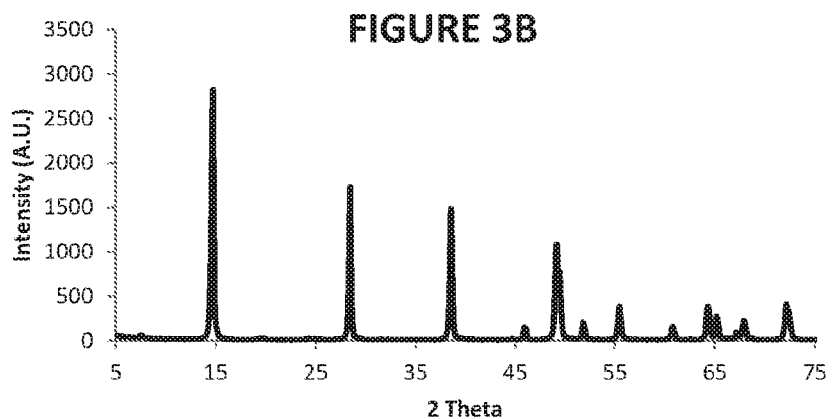
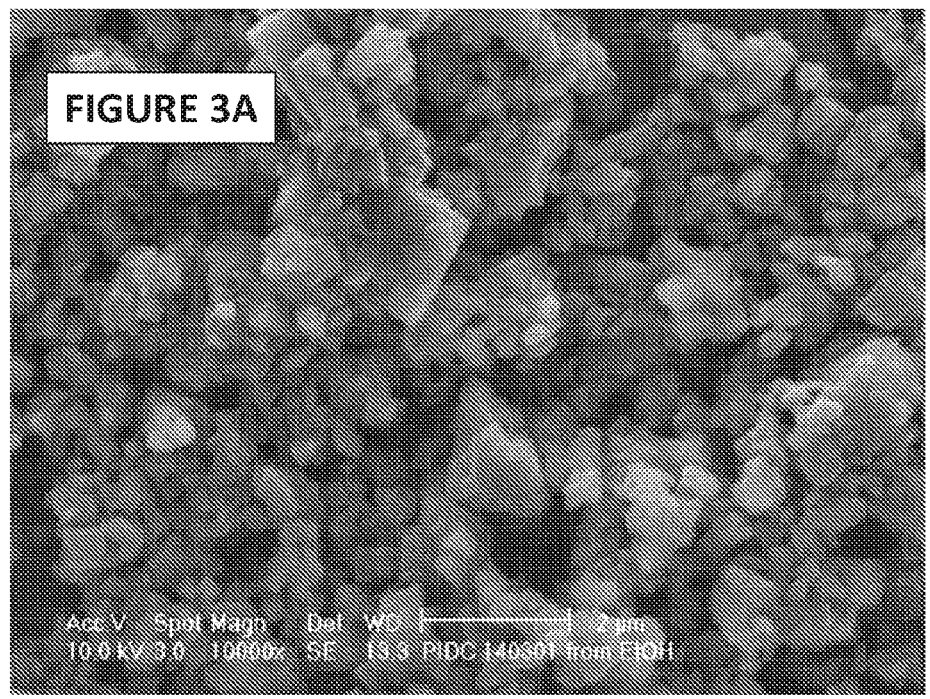

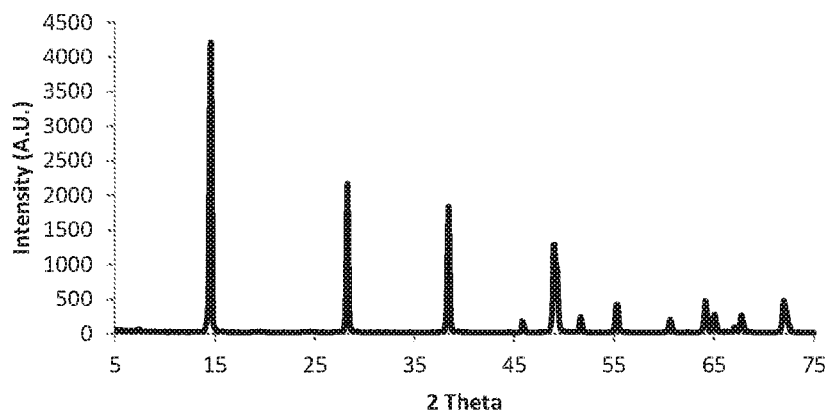
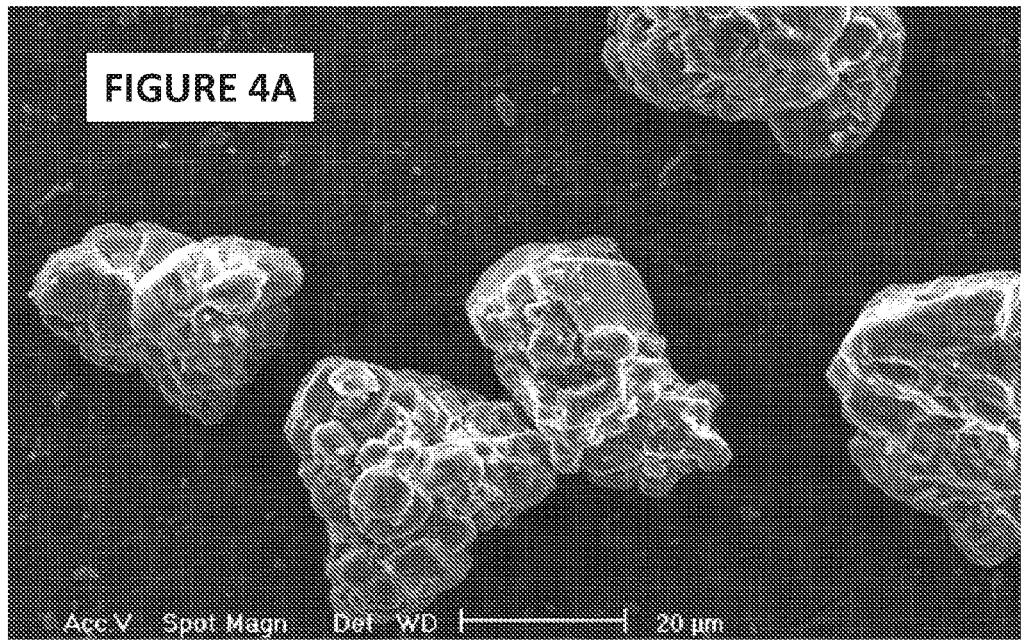

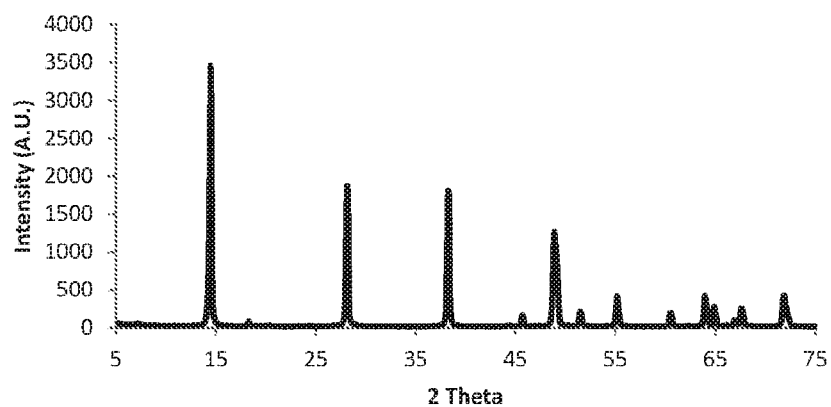
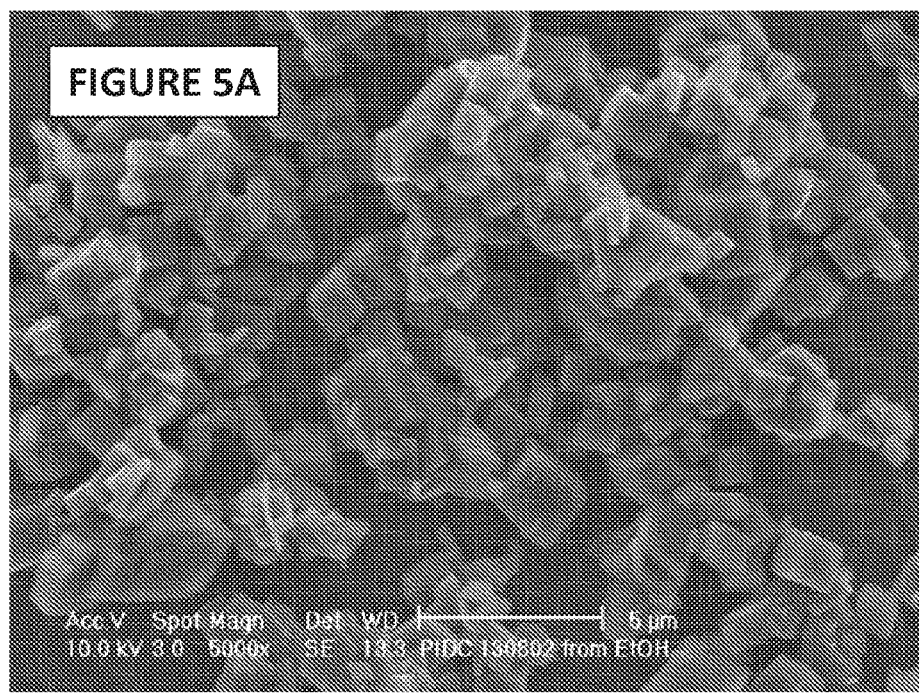

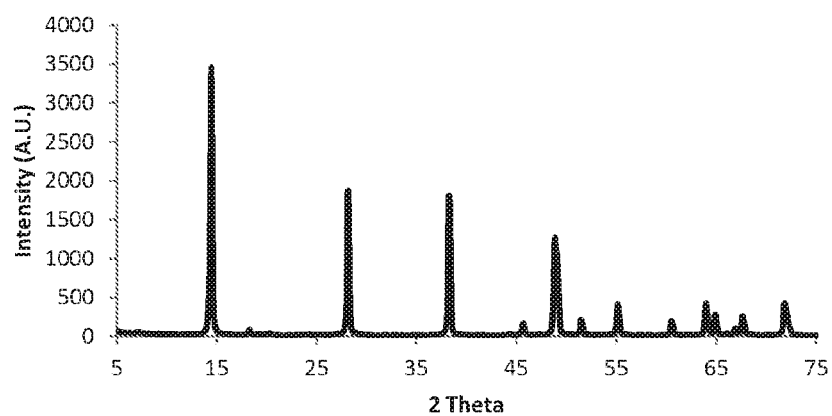
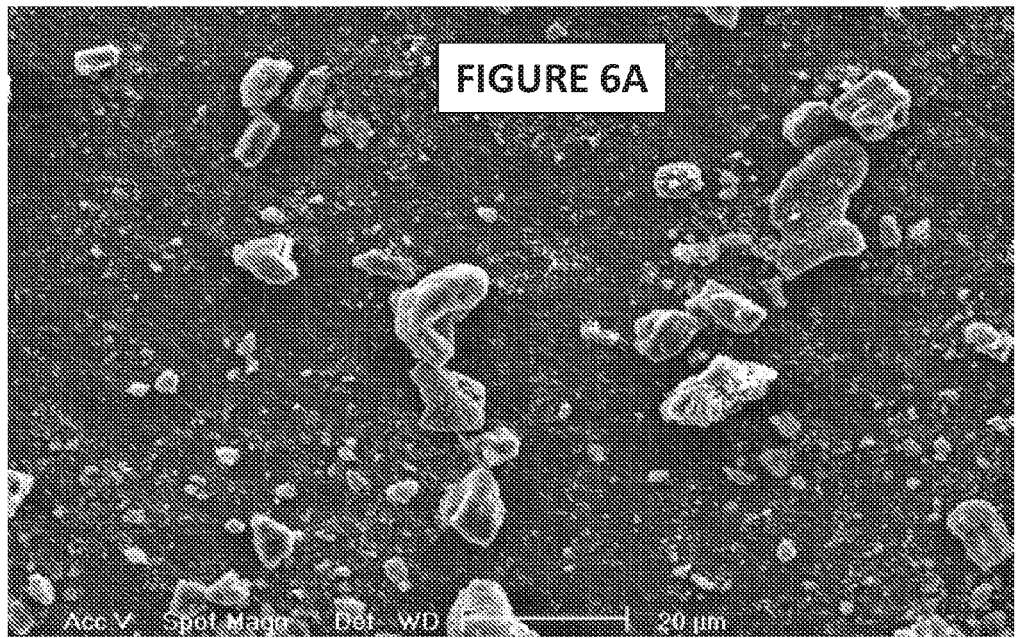

PROCESS FOR PRODUCING NANO-SCALE CRYSTALLINE BOEHMITE

CROSS REFERENCE TO RELATED APPLICATIONS

This application is a continuation of PCT Application Ser. No. PCT/US2015/065011 filed Dec. 10, 2015, designating the United States and published in English, which claims the benefit of the filing date under 35 U.S.C. § 119(e) of U.S. Provisional Application No. 62/090,596 filed Dec. 11, 2014, the entire contents of each of which are hereby incorporated herein by reference.

This disclosure relates generally to a process for producing alumina hydrates, also known as Boehmite. More specifically, this disclosure relates to a method of forming nano-scale crystalline Boehmite.

The statements in this section merely provide background information related to the present disclosure and may not constitute prior art. Engineered plastic formulations have become commonly used in many applications, such as switches, sockets, connectors, fuse boxes, and manifold covers among others, that require the presence of one or more enhanced performance properties. These performance properties often include high impact strength, high durability, flame retardancy, low abrasion, high resistivity towards oil and other aggressive media, high thermal resistance, and/or electrical resistance. To achieve the necessary properties, plastic resins, for example, polyamides, epoxies, and polyesters, are compounded with glass fibers and various other additives specifically designed for use in an injection molding process.

The development of one general, effective flame retardant has been difficult to accomplish due to the wide range of behavior exhibited by known engineered plastic formulations upon exposure to a fire. However, the high thermal stability exhibited by Boehmite (aluminum oxide hydroxide) makes this mineral filler desirable for use in many engineered plastics formulations. In some applications, Boehmite may also be combined with phosphorous-containing and nitrogen-containing flame retardants to provide the desired result. In this type of application the average particle size ($d_{50}$) for the crystalline Boehmite is on the order of 7,000 nanometers (7.0 micrometers) or less.

Several methods that can be used to produce Boehmite include (i) the hydrothermal treatment of aluminum trihydroxide or Gibbsite (i.e., $Al_2O_3$—$3H_2O$) at high temperature (200°-250° C.) and steam pressure; (ii) neutralization of aqueous solutions of aluminum salts, such as aluminum chloride, aluminum sulfate and aluminum nitrate, by alkalis, such as NaOH, KOH and $NH_4OH$; (III) neutralization of aluminates, such as sodium aluminate, by an acid (e.g., HCl or $H_2SO_4$) or carbon monoxide; or (iv) hydrolysis of organic aluminum compounds, such as aluminum alkylates.

The use of these methods leads to the formation of crystalline Boehmite at a relatively high cost and with an average particle size that requires reduction prior to use. The common methods of reducing the average particle size ($d_{50}$) of the crystalline Boehmite to less than 7,000 nanometers, whether the method involves reducing the precursor or the final material, further impacts the overall cost of the final product.

BRIEF SUMMARY OF THE INVENTION

The present disclosure generally provides method of forming a crystalline Boehmite product. This method comprises preparing an aqueous slurry by mixing together water, large aluminum oxide precursors, a highly dispersible Boehmite grade, and optionally, a dispersing agent; adjusting the pH of the slurry to be between about 8.0 to about 12.0; heating the slurry to a temperature between 120° C. and 250° C. for a duration of time that is from about 1.0 hour up to about 24 hours; collecting the slurry to form a wet cake; and drying the wet cake to obtain the crystalline Boehmite product. The crystalline Boehmite product formed using this method exhibits an average particle size ($d_{50}$) that is less than 7,000 nanometers. Optionally the method may further include the use of a dispersing agent, including but not limited to an organic dispersant. This organic dispersant may include without limitation, an acrylic or polyacrylic acid, a salt of acrylic acid, an acrylates copolymer, or a mixture thereof.

According to another aspect of the present disclosure a crystalline Boehmite product is provided that is formed according to the process described above and further defined herein.

According to one aspect of the present disclosure, the pH of the slurry is adjusted to be between about 10.0 and about 12.0. The slurry may be heated to a temperature between about 170° C. to about 220° C., alternatively, about 180° C. The time duration in which the slurry is heated may range between about 1 hour and about 10 hours; alternatively, between about 2 hours and about 5 hours.

The crystalline Boehmite product that is formed exhibits an average particle size ($d_{50}$) that is greater than about 100 nanometers and less than about 3,000 nanometers. Alternatively, the crystalline Boehmite product exhibits an average particle size between about 500 nanometers and 2,000 nanometers. The crystalline Boehmite product may further comprise a crystallite size that is between about 30 nanometers to about 120 nanometers.

According to another aspect of the present disclosure, the highly dispersible Boehmite can act as a seed material. The highly dispersible Boehmite may exhibit a particle size that is less than 100 nm and can be formed using heat and/or shear with concentrations of 0.5% to 7.5% mineral or organic acid relative to the alumina content.

The large aluminum oxide precursors exhibit an average particle size ($d_{50}$) of about 50 micrometers or more. The large aluminum oxide precursors may be a coarse grade Gibbsite.

According to another aspect of the present disclosure, a method of forming a flame retardant composite is provided. This method comprises forming a crystalline Boehmite product according to the process described above and herein that exhibits an average particle size ($d_{50}$) that is less than 7,000 nanometers; mixing the crystalline Boehmite product with a plastic resin to form a flame retardant plastic mixture; and subjecting the flame retardant plastic mixture to a conventional plastic processing method to form a flame retardant composite.

The plastic resin may be selected as either a thermoplastic or a thermoset resin. The thermoplastic resin may be selected as one from the group of olefin resins, aromatic polyesters, polyesters, and polyamides. The thermoset resin may be selected as one from the group of an epoxy resin, vinyl ester resin, phenol resin, unsaturated polyester resin, polyimide, polyurethane, and melamine resin. The plastic resin may be processed using any conventional methodology, such as compounding, extrusion, or molding.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3A is a photomicrograph of a crystalline Boehmite product formed according to the teachings of the present disclosure;

FIG. 3B is a x-ray diffraction pattern measured for the crystalline Boehmite product shown in FIG. 3A;

FIG. 4A is a photomicrograph of a comparative crystalline Boehmite product formed according to a conventional method;

FIG. 4B is a x-ray diffraction pattern measured for the comparative crystalline Boehmite product shown in FIG. 4A;

FIG. 5A is a photomicrograph of a comparative crystalline Boehmite product formed according to another conventional method;

FIG. 5B is a x-ray diffraction pattern measured for the comparative crystalline Boehmite product shown in FIG. 5A;

FIG. 6A is a photomicrograph of a comparative crystalline Boehmite product formed according to yet another conventional method; and FIG. 6B is a x-ray diffraction pattern measured for the comparative crystalline Boehmite product shown in FIG. 6A.

DETAILED DESCRIPTION

Figure 1:
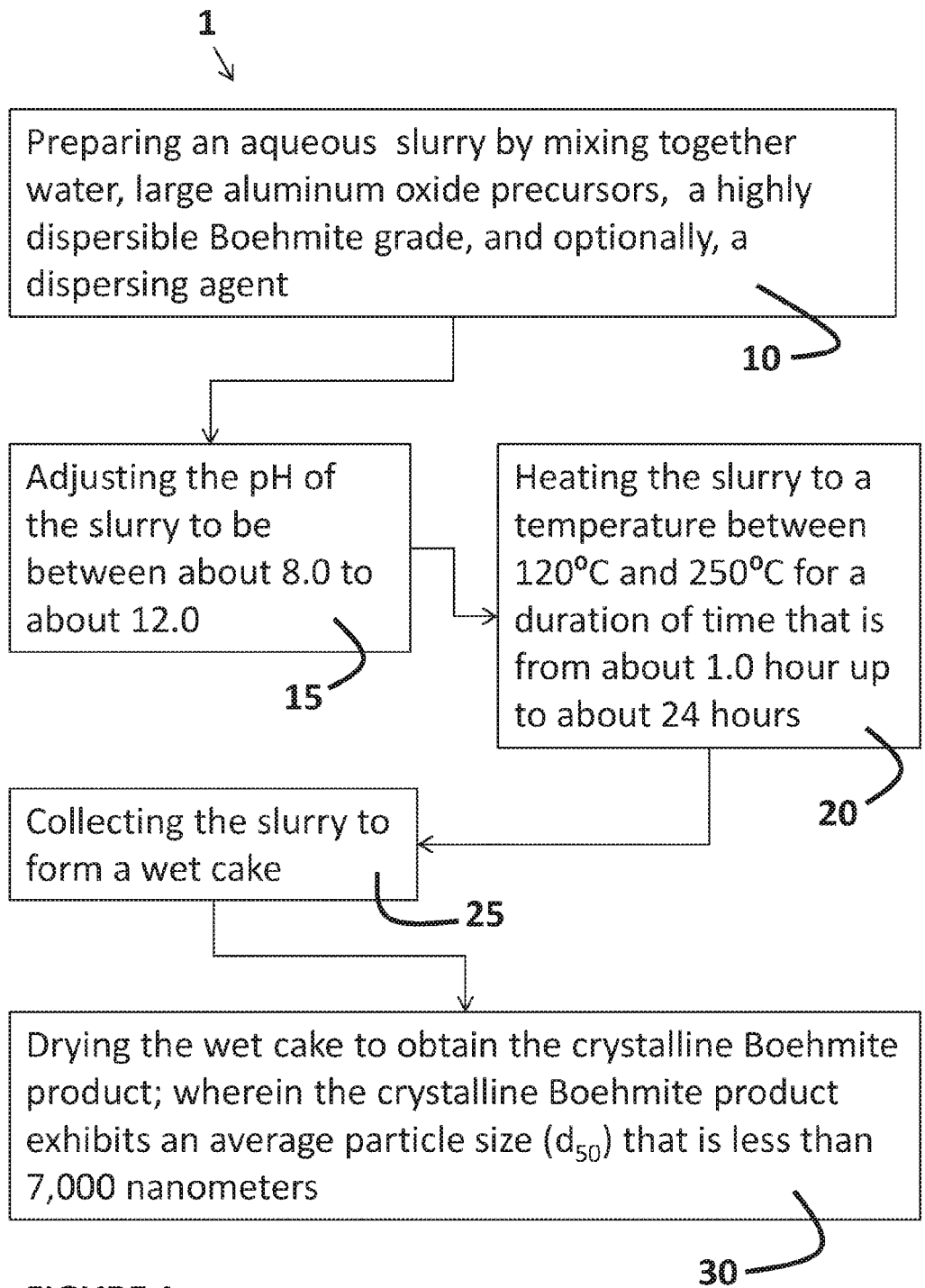
FIG. 1 is a schematic representation of a method of forming a crystalline Boehmite product according to the teachings of the present disclosure.

The following description is merely exemplary in nature and is in no way intended to limit the present disclosure or its application or uses. It should be understood that throughout the description, corresponding reference numerals indicate like or corresponding parts and features.

The present disclosure generally relates to the formation of crystalline Boehmite having an average particle size ($d_{50}$) that is 7.0 micrometers or less, alternatively less than about 3.0 micrometers. The Boehmite made and used according to the teachings contained herein is described throughout the present disclosure in conjunction with its use as a flame retardant in order to more fully illustrate the concept. The incorporation and use of Boehmite formed according to the process described herein in other applications is contemplated to be within the scope of the disclosure.

The term "Boehmite" is generally used to describe an alumina hydrate that exhibits an x-ray diffraction (XRD) pattern that is similar to aluminum oxide-hydroxide, AlO(OH). Boehmite may contain various amounts of water of hydration and may, therefore, exhibit a range in surface area, pore volume, and specific density, as well as thermal characteristics upon thermal treatment. The degree of crystallinity, crystal size, and amount of imperfections in the Boehmite can be determined by the sharpness and location of the peaks within the measured XRD pattern. Boehmite may be utilized as ceramic materials, abrasive materials, retardants, adsorbents, fillers in composites, and catalysts, such as those used in refinery operations, for hydro-processing hydrocarbon feeds, for pollution control, hydrocarbon cracking, the production of ethylene oxide or methanol, the conversion of chlorofluorohydrocarbons (CFCs), and the reduction of nitrogen oxide from exhaust gases of gas turbines.

Referring to FIG. 1, the method 1 generally comprises preparing 10 an aqueous slurry by mixing together water, a coarse grade Gibbsite, a highly dispersible Boehmite grade to act as a seed material, and optionally, a dispersing agent; adjusting 15 the pH of the slurry; heating 20 the slurry; collecting 25 the slurry to form a wet cake; drying 30 the wet cake to obtain the crystalline Boehmite product, wherein the crystalline Boehmite product exhibits an average particle size ($d_{50}$) that is less than about 7,000 nanometers (7.0 micrometers). During the process, the pH of the slurry is adjusted 15 to be between about 8.0 to about 12.0; alternatively, between about 10.0 and about 12.0; alternatively, about 11.0. The slurry is heated 20 to a temperature between 120° C. and 250° C. for a time duration that is from about 1 hour up to about 24 hours. Alternatively, the slurry is heated 20 to a temperature between about 170° C. to 220° C.; alternatively, about 180° C. The time duration during which the slurry is heated 20 may alternatively be between about 1 hour and about 10 hours; alternatively, between about 2 hours and about 5 hours.

The pH and the temperature of the slurry represent features in the preparation of the crystalline Boehmite product that affect the rate of crystallization that occurs for the Boehmite. More specifically, the crystallization rate increases with both an increase in pH and/or temperature. In other words, the higher the pH and/or temperature utilized in the process, the greater the potential for forming crystalline Boehmite.

The average particle size, $D_{50}$, is defined as the median diameter or medium value of particle diameter by mass and is usually expressed in nanometers (nm) or micrometers (μm). A measurement of $D_{50}$ for a Boehmite product may be obtained by any method known to one skilled in the art, including without limitation sieve analysis, air elutriation analysis, photoanalysis, optical counting methods, electroresistance counting methods, sedimentation techniques, laser diffraction methods, and acoustic spectroscopy. Referring again to FIG. 1, the crystalline Boehmite product formed by the method 1 of the present disclosure exhibits an average particle size ($d_{50}$) that is less than about 7,000 nanometers (7.0 micrometers). Alternatively, the average particle size ($d_{50}$) is greater than about 100 nanometers and less than about 3,000 nanometers; alternatively between about 500 nanometers and 2,000 nanometers.

According to another aspect of the present disclosure, the crystalline Boehmite product further comprises a crystallite size that is between about 20 nanometers to about 150 nanometers; alternatively, between about 30 nanometers to about 120 nanometers; alternatively, between about 50 nanometers to about 100 nanometers. The crystallite size can measured utilizing x-ray diffraction (XRD) spectroscopy. One example of an instrument capable of measuring the crystallite size is a Rigaku Miniflex 2 benchtop XRD spectrometer. The crystallite size is obtained by measuring the peak at the 021 reflections and then calculated using the Scherrer equation not accounting for any background or peak fitting.

The small average particle size ($d_{50}$) exhibited by the crystalline Boehmite product formed according to the teachings of the present disclosure is beneficial to reducing the overall cost of the product when used in an application that requires a small particle size, such as for example, flame retardants and metal passivation. Conventional processes for forming crystalline Boehmite typically result in an average particle size ($d_{50}$) that is greater than about 50 micrometers and require additional processing steps, such as milling. The term "milling" is defined as any known process or technique that results in a reduction in the average particle size ($d_{50}$) exhibited by the alumina product. Examples of techniques that are used in such milling processes include ball or attritor mills, jet mills, high-shear mixers, and colloid mixers to name a few.

According to another aspect of the present disclosure, the method of producing crystal Boehmite uses large aluminum oxide precursors that exhibit an average particle size ($d_{50}$) that is about 50 micrometers or larger. These large aluminum precursors may be a coarse grade Gibbsite, such as that commonly found to exist with many commercial Gibbsite. Several examples of commercial gibbsite include hydrated alumina or aluminum hydroxide, e.g., C-30 (Alcoa World Alumina LLC, Pittsburgh, Pa.) and GB/T 4294-2010 (Aluminum Corporation of China Ltd. or CHALCO, Beijing, China), among others.

According to another aspect of the present disclosure, the highly dispersible Boehmite acts as a seed material in the slurry. One example, of this highly dispersible Bohemite is the Alumax PB-950 product manufactured by Pacific Industrial Development Corporation, Ann Arbor, Mich. Highly dispersible Boehmite may be prepared via a precipitation process and can be defined as having greater than 95% of the product being readily dispersed to particles less than 100 nm using heat and/or shear in the presence of a small amount of mineral or organic acid. The heat and/or shear provided by the hydrothermal treatment may also act to disperse the Boehmite and provide an initial seed material. The amount of mineral or organic acid may be in the range of about 0.5% to about 7.5% weight of the entire weight of the dispersion.

Optionally, the process for forming the crystalline Boehmite product may include the use of a dispersing agent or surfactant as part of the slurry that is created. Alternatively, the dispersing agent is an organic dispersant. This organic dispersant may be without limitation, polyacrylic acid, a salt of polyacrylic acid, an acrylates copolymer, or a mixture thereof. Several examples of salts of polyacrylic acid include ammonium polyacrylate, mixed potassium aluminum polyacrylate, potassium polyacrylate, and sodium polyacrylate, among others. Several examples of acrylates copolymers, include, but are not limited to, ammonium acrylates copolymers, ethylene/acrylic acid copolymers, ethylene/sodium acrylate copolymers, acrylates/ammonium methacrylate copolymers, styrene/acrylates copolymers, acrylates/hydroxyesters acrylates copolymers, ethylene/methacrylate copolymers, and sodium acrylates/acrolein copolymers.

According to another aspect of the present disclosure, water may be added in the range of 60% up to 90% relative to the overall weight of the slurry, the seed material can be added in the ratio from 0.05 to 0.25 to coarse grade gibbsite, the coarse grade gibbsite can be added from 10% to 30% relative to the overall weight of the slurry, and the optional dispersant can be added from 0.001% up to 0.02% relative to the overall weight of the slurry.

According to another aspect of the present disclosure, the crystalline Boehmite product prepared according to the teachings of the present disclosure can be used to provide mechanical durability and flame retardancy to various types of plastic composites, such as printed circuit boards and cable jacketing to name a few. Boehmite lends itself to this type of application because it does not begin to thermally decompose until it reaches a temperature of about 340° C. as shown in Equation 1. The use of Boehmite as a flame retardant is of relevance whenever the temperature encountered during the processing of the plastic exceeds 200° C. or when end-use applications need to pass prolonged ageing tests conducted at elevated temperatures.

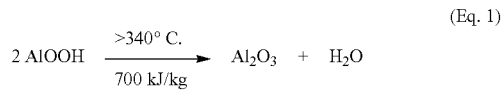
(Eq. 1)
$$2\, AlOOH \xrightarrow[700\ kJ/kg]{>340°\ C.} Al_2O_3 + H_2O$$

The plastic composites may include thermoplastic materials or thermoset materials without limitation. Several specific examples of thermoplastic materials include, but are not limited to, blends of polyethylene (PE) and ethylene-vinylacetate-copolymers and elastomers like ethylene-propylene-diene-monomers (EPDM) and silicone rubbers (SR). Several examples of the thermoplastic resin include, without limitation, olefin resins, such as, olefin homopolymers (e.g., polyethylene, polypropylene, and polybutene) and olefin copolymers (e.g., ethylene-propylene random copolymers, ethylene-propylene block copolymers, propylene-butene random copolymers, propylene-butene block copolymers, and ethylene-propylene-butene copolymers); aromatic polyesters, such as polyethylene terephthalate and polybutylene terephthalate; polyesters, such as polycaprolactam and polyhydroxybutyrate; and polyamides, such as nylon-6, nylon-66, nylon-10, nylon-12 and nylon-46. Several examples of the thermosetting resin include, without limitation, epoxy resin, vinyl ester resin, phenol resin, unsaturated polyester resin, polyimide, polyurethane, and melamine resin. The amount of the gibbsite type aluminum hydroxide particles to be filled is usually about from 30 to 150 parts by mass per 100 parts by mass of the resin. Additional information may be obtained in U.S. Patent Publication No. 2007/0116641, the entire contents of which are hereby incorporated by reference.

Figure 2:
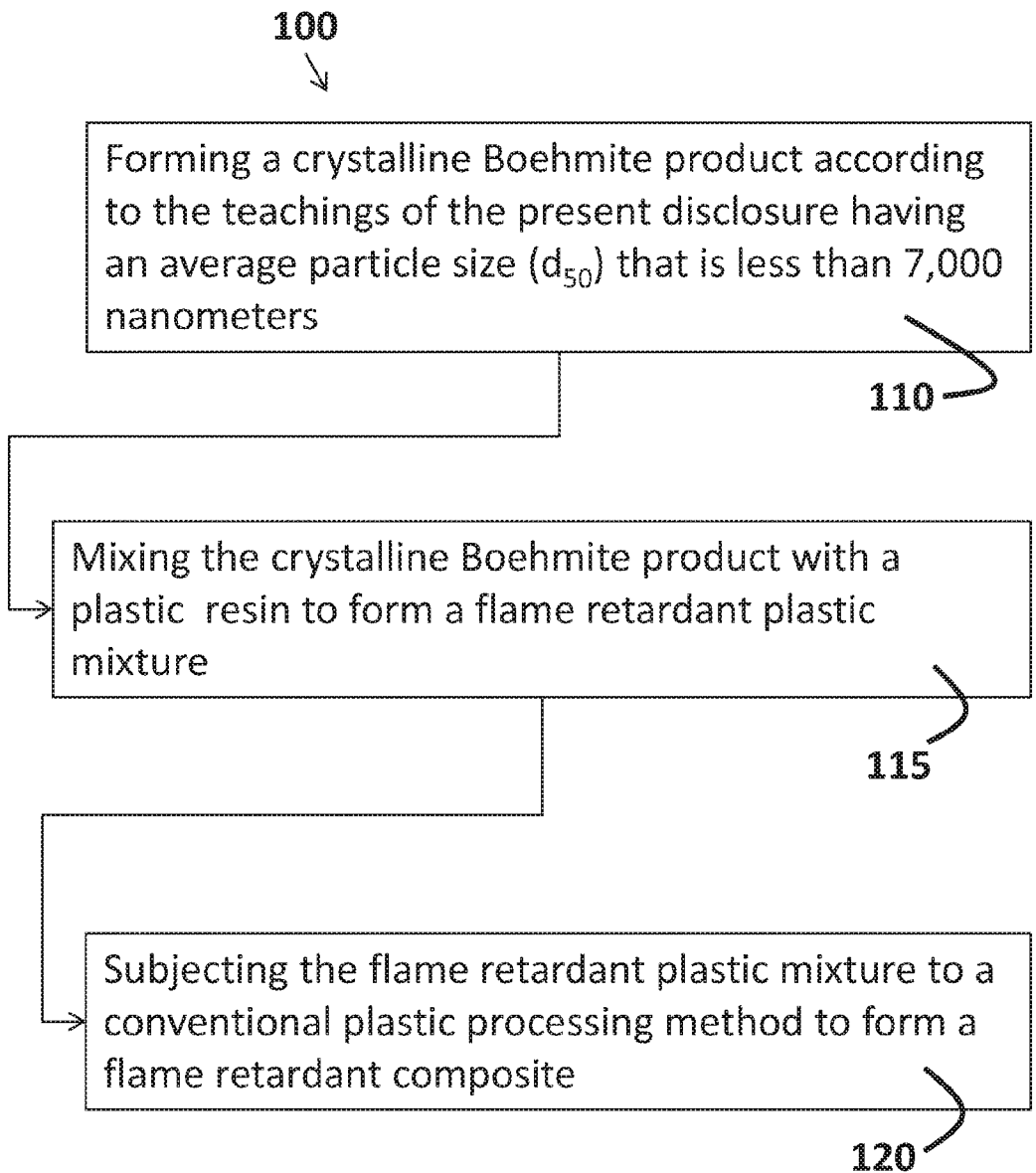
FIG. 2 is a schematic representation of a method of forming a flame retardant composite utilizing the crystalline Boehmite product formed according to the method of FIG. 1.

Referring now to FIG. 2, a method 100 for forming a flame retardant composite comprises preparing 110 a crystalline Boehmite product according the teachings of the present disclosure followed by mixing 115 said product with a plastic resin to form a flame retardant plastic mixture. This flame retardant plastic mixture is then subjected to a conventional plastic processing method to form a flame retardant composite. Several examples of conventional plastic processing methods include compounding, extrusion, and molding, without limitation.

The following specific embodiments are given to illustrate the method of forming a crystalline Boehmite product according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

EXAMPLE 1

Method of Forming Crystalline Boehmite Product

A total of 700 grams of deionized (DI) water is combined with 0.03 grams of ammonium polyacrylate as a dispersing agent under mixing conditions. A total of 270 grams of Gibbsite (coarse grade alumina) and 30 grams of a highly dispersible Boehmite (Alumax PB-950, Pacific Industrial Development Corporation, Ann Arbor, Mich.) is added to the water and dispersing agent to form a slurry. The slurry is mixed for 15 minutes to ensure homogeneity. The acidity/basicity of the slurry is then adjusted to a pH of 11.0 using sodium hydroxide crystals. The slurry is placed into a Parr 2-liter autoclave and heated to a temperature of 180° C. for the duration of 1.5 hours with continued stirring of the slurry at a speed of 200 rpm. The slurry is then removed and filtered to obtain a wet cake, which is then dried at 120° C. overnight (about 12-14 hours).

The final product is verified by x-ray diffraction (XRD) to be crystalline Boehmite as shown in the micrograph of FIG. 3A and XRD spectrum of FIG. 3B. The crystalline Boehmite is verified in the XRD spectrum as the peaks at the reflections 020 and 021. The micrograph shows an agglomerate of submicron particles (<800 nm).

The resulting particle distribution is also measured using a Horiba LA920WET with the average particle size ($d_{50}$) being determined to be 1,300 nanometers. The crystalline Boehmite formed in this example is suitable for use in applications without having to introduce a milling or grinding step to further reduce the average particle size. This example demonstrates the formation of a crystalline Boehmite product according to the present disclosure without having to grind or mill the raw material or product to have the crystalline Boehmite exhibit an average particle size ($d_{50}$) that is suitable for use as a flame retardant

EXAMPLE 2

Comparative Example A

A total of 700 grams of deionized (DI) water is combined with 0.03 grams of ammonium polyacrylate under mixing conditions. A total of 300 grams of Gibbsite (coarse grade alumina) is added to the water and dispersing agent and mixed for 15 minutes to ensure homogeneity. The acidity/basicity of the mixture is then adjusted to a pH of 11.0 using sodium hydroxide crystals. The mixture is placed into a Parr 2-liter autoclave and heated to a temperature of 180° C. for the duration of 1.5 hours with continued stirring of the mixture at a speed of 200 rpm. The mixture is then removed and filtered to obtain a wet cake, which is then dried at 120° C. overnight (about 12-14 hours).

The final product is verified by x-ray diffraction (XRD) to be crystalline Boehmite as shown in the micrograph of FIG. 4A and XRD spectrum of FIG. 4B. The crystalline Boehmite is verified in the XRD spectrum as the peaks at the reflections 020 and 021. The micrograph shows larger crystalline particles greater than 5 microns in size.

The resulting particle distribution is also measured using a Horiba LA920WET with the average particle size ($d_{50}$) being determined to be 75,000 nanometers. The crystalline Boehmite formed in this example is too large for use in applications without having to introduce a milling or grinding steps to further reduce the average particle size. This example demonstrates the formation of a crystalline Boehmite product according to a conventional method exhibits an average particle size ($d_{50}$) that is not suitable for use as a flame retardant without being subjected to additional milling processes.

EXAMPLE 3

Comparative Example B

A total of 700 grams of deionized (DI) water is combined with 0.03 grams of ammonium polyacrylate under mixing conditions. A total of 300 grams of Gibbsite (jet milled alumina) is added to the water and dispersing agent and mixed for 15 minutes to ensure homogeneity. In this example, the Gibbsite (coarse grade alumina) of Example 1 or 2, which has an average particle size ($d_{50}$) of about 75,000 nanometers, is subjected to milling prior to being added to the mixture by using a pancake style Hosakawa jet mill. This milling or grinding process resulted in reducing the average particle size ($d_{50}$) of the Gibbsite starting material to 2,000 nanometers.

The acidity/basicity of the mixture is then adjusted to a pH of 11.0 using sodium hydroxide crystals. The mixture is placed into a Parr 2-liter autoclave and heated to a temperature of 180° C. for the duration of 1.5 hours with continued stirring of the mixture at a speed of 200 rpm. The mixture is then removed and filtered to obtain a wet cake, which is then dried at 120° C. overnight (about 12-14 hours).

The final product is verified by x-ray diffraction (XRD) to be crystalline Boehmite as shown in the micrograph of FIG. 5A and XRD spectrum of FIG. 5B. The crystalline Boehmite is verified in the XRD spectrum as the peaks at the reflections 020 and 021. The micrograph shows an agglomerate of submicron particles (<1000 nm).

The resulting particle distribution is also measured using a Horiba LA920WET with the average particle size ($d_{50}$) being determined to be 7,500 nanometers. The crystalline Boehmite formed in this example is too large for use in applications without having to introduce an additional milling or grinding step to further reduce the average particle size of the final product. This example demonstrates the formation of a crystalline Boehmite product according to another conventional method exhibits an average particle size ($d_{50}$) that is not suitable for use as a flame retardant without being subjected to additional milling processes.

EXAMPLE 4

Comparative Example C

A total of 700 grams of deionized (DI) water is combined with 0.03 grams of ammonium polyacrylate under mixing conditions. A total of 300 grams of Gibbsite (coarse grade alumina) and 30 grams of the crystal Boehmite from Example 1 is added to the water and dispersing agent and mixed for 15 minutes to ensure homogeneity. The acidity/basicity of the mixture is then adjusted to a pH of 11.0 using sodium hydroxide crystals. The mixture is placed into a Parr 2-liter autoclave and heated to a temperature of 180° C. for the duration of 1.5 hours with continued stirring of the mixture at a speed of 200 rpm. The mixture is then removed and filtered to obtain a wet cake, which was then dried at 120° C. overnight (about 12-14 hours).

The final product is verified by x-ray diffraction (XRD) to be crystalline Boehmite as shown in the micrograph of FIG. 6A and XRD spectrum of FIG. 6B. The crystalline Boehmite is verified in the XRD spectrum as the peaks at the reflections 020 and 021. The micrograph shows particle with a size greater than about 6,000 nm.

The resulting particle distribution is also measured using a Horiba LA920WET with the average particle size ($d_{50}$) being determined to be 6,000 nanometers. The crystalline Boehmite formed in this example is too large for use in applications without having to introduce an additional grinding step to further reduce the average particle size of the final product. This example demonstrates the formation of a crystalline Boehmite product according to yet another conventional method exhibits an average particle size ($d_{50}$) that is not suitable for use as a flame retardant without being subjected to additional milling processes.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of forming a crystalline Boehmite product, the method comprising:
    preparing an aqueous slurry by mixing together water, large aluminum oxide precursors, a highly dispersible Boehmite grade, and optionally, a dispersing agent;
    adjusting the pH of the slurry to be between about 8.0 to about 12.0;
    heating the slurry to a temperature between 120° C. and 250° C. for a duration of time that is from about 1.0 hour up to about 24 hours;
    collecting the slurry to form a wet cake; and
    drying the wet cake to obtain the crystalline Boehmite product;
    wherein the crystalline Boehmite product exhibits an average particle size ($d_{50}$) that is greater than about 100 nanometers and less than about 3,000 nanometers;
    wherein the large aluminum oxide precursors exhibit an average particle size ($d_{50}$) of 50 micrometers or more; and
    wherein the crystalline Boehmite product comprises a crystallite size that is between about 30 nanometers to about 120 nanometers.

2. The method according to claim 1, wherein the method includes the use of an organic dispersing agent.

3. The method according to claim 2, wherein the organic dispersing agent is polyacrylic acid, a salt of polyacrylic acid, an acrylates copolymer, or a mixture thereof.

4. The method according to claim 1, wherein the pH of the slurry is adjusted to be between about 10.0 and about 12.0.

5. The method according to claim 1, wherein the slurry is heated to a temperature between about 170° C. to about 220° C.

6. The method according to claim 5, wherein the slurry is heated to a temperature of about 180° C.

7. The method according to claim 1, wherein the slurry is heated for a time duration between about 1 hour and about 10 hours.

8. The method according to claim 7, wherein the slurry is heated for a time duration between about 2 hours and about 5 hours.

9. The method according to claim 1, wherein the average particle size ($d_{50}$) of the crystalline Boehmite product is between about 500 nanometers and 2,000 nanometers.

10. The method according to claim 1, wherein the highly dispersible Boehmite acts as a seed material.

11. The method according to claim 1, wherein the large aluminum oxide precursors are a coarse grade Gibbsite.

12. The method according to claim 1, wherein the highly dispersible Boehmite exhibits a particle size that is less than 100 nm and is formed using heat and/or shear with concentrations of 0.5% to 7.5% mineral or organic acid relative to the alumina content.

13. The method according to claim 1, further comprising
    mixing the crystalline Boehmite product with a plastic resin to form a flame retardant plastic mixture; and
    subjecting the flame retardant plastic mixture to a conventional plastic processing method to form a flame retardant composite.

14. The method according to claim 13, wherein the plastic resin is selected as either a thermoplastic or a thermoset resin.

15. The method according to claim 14, wherein the plastic resin is a thermoplastic resin selected as one from the group of olefin resins, aromatic polyesters, polyesters, and polyamides.

16. The method according claim 14, wherein the plastic resin is a thermoset resin selected as one from the group of an epoxy resin, vinyl ester resin, phenol resin, unsaturated polyester resin, polyimide, polyurethane, and melamine resin.

17. The method according to claim 13, wherein the plastic processing method is compounding, extrusion, or molding.

* * * * *